(12) United States Patent
Szasz et al.

(10) Patent No.: US 8,776,616 B2
(45) Date of Patent: Jul. 15, 2014

(54) MULTIAXIAL FORCE-TORQUE SENSORS

(75) Inventors: Paul Szasz, Plankstadt (DE); Manfred Wetzko, Schriesheim (DE); Peter Krippner, Karlsruhe (DE); Torgny Brogardh, Västeras (SE); Markus Roos, Zug (CH)

(73) Assignee: ABB AG, Mannheim (DE)

( * ) Notice: Subject to any disclaimer, the term of this patent is extended or adjusted under 35 U.S.C. 154(b) by 34 days.

(21) Appl. No.: 13/492,136

(22) Filed: Jun. 8, 2012

(65) Prior Publication Data

US 2012/0266694 A1    Oct. 25, 2012

Related U.S. Application Data

(63) Continuation of application No. PCT/EP2009/008730, filed on Dec. 8, 2009.

(51) Int. Cl.
*G01L 1/22* (2006.01)
(52) U.S. Cl.
USPC ...................................... 73/862.044
(58) Field of Classification Search
USPC ...................... 73/862.041–862.046
See application file for complete search history.

(56) References Cited

U.S. PATENT DOCUMENTS

| | | | | | |
|---|---|---|---|---|---|
| 4,448,083 | A | * | 5/1984 | Hayashi | 73/862.042 |
| 4,550,617 | A | * | 11/1985 | Fraignier et al. | 73/862.042 |
| 4,573,362 | A | * | 3/1986 | Amlani | 73/862.045 |
| 4,672,855 | A | * | 6/1987 | Schmieder | 73/862.041 |
| 6,253,626 | B1 | * | 7/2001 | Shoberg et al. | 73/862.044 |
| 7,743,672 | B2 | * | 6/2010 | Kurtz et al. | 73/862.046 |
| 8,342,795 | B2 | * | 1/2013 | Hodapp | 415/55.1 |

FOREIGN PATENT DOCUMENTS

WO    WO 2010/088922 A1    8/2010

\* cited by examiner

*Primary Examiner* — Max Noori
(74) *Attorney, Agent, or Firm* — Buchanan Ingersoll & Rooney PC

(57) ABSTRACT

The disclosure relates to a multiaxial force-torque sensor having a transducer structure, with strain gauges placed in defined areas to measure the strain, from which the forces and torques are calculated, and where the transducer structure can include (e.g., consist of) two concentric rings connected with spokes. The transducer structure can be a planar mechanical structure, and all strain gauges can be applied to the same surface of the transducer structure to measure non-radial strain components.

24 Claims, 3 Drawing Sheets

MULTIAXIAL FORCE-TORQUE SENSORS

RELATED APPLICATION(S)

This application claims priority as a continuation application under 35 U.S.C. §120 to PCT/EP2009/008730 filed as an International Application on Dec. 8, 2009 designating the U.S., the entire content of which is hereby incorporated by reference in its entirety

FIELD

The disclosure relates to multiaxial force-torque sensors having a transducer structure, with strain gauges placed in defined areas of one single surface of the transducer to measure the strain, from which forces and torques are calculated, and where the transducer structure includes two concentric rings connected with spokes.

BACKGROUND INFORMATION

Multiaxial force-torque sensors can be designed as a complex 3-dimensional transducer structure, with strain gauges placed in defined areas to measure strain, from which forces and torques can be calculated.

The transducer structure can include two concentric rings connected with spokes (3-4). In order to get information on all six axes (3 forces, 3 torques) and to achieve comparable sensitivity for all force and torque axes, strain gauges should be placed on different sides of the spokes, and partly also on the concentric rings.

The known transducer geometry can be highly complex, and can lead to a relatively large machining effort and consequently high cost. Additionally the application of the strain gauges to different sides of the spokes can only be made by handwork, which can take a long time and cause high cost.

Consequently, such sensors can be relatively expensive and this can limit their use to small volume special cost insensitive robot applications and to R&D (maximum 100 sensors of one type per year). Having a low cost multiaxial sensor available could extend the use of such sensors to large volume applications (several 100 to several 1000 sensors of one type per year), e.g. in robots, automotive, healthcare, etc.

Measuring three force and torque components with a planar mechanical structure using strain gauges placed on only one surface of the structure can be challenging. This is connected to symmetry properties of the structure.

SUMMARY

A multiaxial force-torque sensor is disclosed, comprising a transducer structure, including two concentric rings connected with spokes and strain gauges placed in defined areas to measure strain, from which forces and torques are calculated, wherein the transducer structure is a planar mechanical structure, and all strain gauges are applied to a same surface of the transducer structure for measuring non-radial strain components.

BRIEF DESCRIPTION OF THE DRAWINGS

By the drawings attached to the disclosure, specific advantages, and exemplary embodiments shall be explained and illustrated.

DETAILED DESCRIPTION

Figure 1:
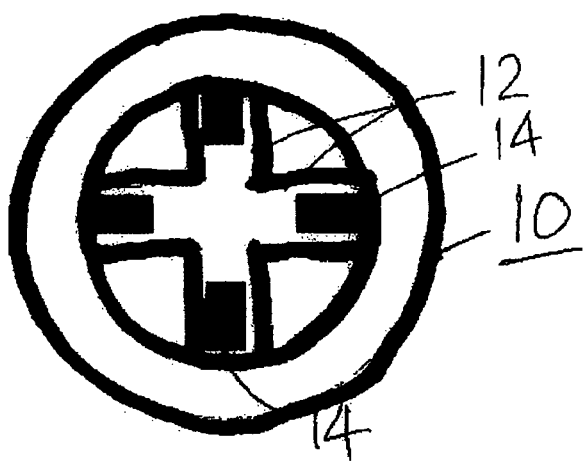
FIG. 1 shows a known radially symmetric spoke wheel where each spoke is equipped with one strain gauge.

Exemplary embodiments of the disclosure provide a force-torque transducer, which can be manufactured from low cost sheet metal material and can be easily machined on only one surface, for example, by using a low cost 2 degrees of freedom CNC-machine. The transducer structure can also make it possible to place all strain gauges on the same surface, for example, using a low-cost automatable process. This can enable low-cost force-torque sensors for mass production.

Because embodiments described herein can be based on a planar, quasi-2-dimensional structure, the transducer can also be made from a sheet-type material, and all strain measurement devices can be mounted on one surface at different locations of the sheet.

According to an exemplary embodiment of the disclosure, it is envisaged to use the possible minimum number of strain measurement devices to further limit assembly work effort and thus limit cost. Strain measurement devices can be strain gauges but alternative techniques, too, e.g. piezo-resistive materials, magneto-resistive materials, optical readout, etc. can also be applicable to this concept.

If one considers a sensor including symmetrically placed radial spokes connecting an inner disk to a fixed outer annulus, then generally these spokes contain symmetrically placed gauges to measure the radial strain components due to the centrally applied force and/or torque. Such a structure exhibits a number of symmetry elements, e.g., 3-fold rotations and 3 mirror planes for a 3 spokes system. It may then not be possible to obtain selective measurements of 3 forces and 3 torques.

In order to address this issue with symmetry, it has been found that for a planar mechanical sensor structure, the strain gauges should be applied to the transducer structure such that non-radial strain components are measured.

Two ways to perform such measurement are:
A) Using spokes that are not radially symmetric; and
B) Measuring non-radial strain components, i.e., shear strains along the spokes.

Adopting A) by using spokes that are tilted with respect to the radial direction by an angle α, the strain values $s_i(-T_z)=-s_i(T_z)$ are being obtained for the gauge signals. This enables the formulation of a calibration function $t_z(s_1, \ldots, s_N)$ with the correct properties.

Such a structure may still exhibit the 3-fold rotational symmetry elements, but no longer has mirror planes containing the z-axis.

Scheme B), which provides structures that enable $T_z$-detection, can also lead to more than the minimal number of strain gauges. This is due to the fact that shear strains are absent for the application of $F_z$, that is, one needs extra gauges to measure both $T_z$ and $F_z$ on a maximally symmetric sensor.

It is clear that one can include at least 6 strain gauges to measure all 3 force and 3 torque components. Therefore it is concluded that a minimal system with exactly 6 gauges cannot be maximally symmetric. The asymmetry can also be obtained by placing the strain gauges in an out of spoke-axis position, instead of tilting the spoke as a whole.

When the application of an axial torque $T_z$ occurs, i.e., that the torque vector component is normal to the sensor plane, this can lead to identical sensor signals on symmetrically equivalent gauges. Specifically, the radial strain component on each spoke is independent of the sign of $T_z$, i.e., formally these signals extend from $s_i(-T_z)$ to $s_i(T_z)$, where i=1, . . . , N runs over all N gauges.

A calibration function $t_z(s_1, \ldots, s_N)$ that returns the $T_z$-component in terms of the strain gauge signals have a change of sign by passing from $T_z$ to $-T_z$. This can be impossible given the relation $s_i(-T_z)=s_i(T_z)$ above. Therefore it is concluded that such a structure cannot detect the axial torque component. The situation is different for the axial force component $F_z$. Passing from $F_z$ to $-F_z$ will change the sign of the signals due to radial strains $s_i(-F_z)=-s_i(F_z)$, which enables the setting up a calibration function $f_z(s_i, \ldots, s_N)$. This depends on the basic fact that the strain gauges are "compressed" at a positive Fz because of bending of the spokes in the positive z-direction while the strain gauges are "stretched" at a negative Fz when the spokes are bent in the negative z-direction. In the case of Tz, the spokes are bent in a direction parallel to the same plane that the sensors are mounted on and the same "compression" is obtained for +Tz and −Tz. In order to get around this in the force/torque sensors manufactured today, sensors are mounted on 2 orthogonal sides of the spokes.

In some cases it seems possible to setup a theory based on the group theory of symmetries and their representations to rigorously prove the above argument. The key ingredient will be that force is a vector quantity, while torque is a so called "pseudo" vector that behaves differently under mirror symmetries compared to normal vectors.

One further solution according to an exemplary embodiment of the disclosure is a planar structure including two concentric rings connected with spokes which at first sight are similar to the known structure. A difference is that the complete structure has a uniform, rather limited thickness, so that only the contour has to be machined, if a suitable sheet material of e.g. steel or aluminum is provided, e.g. via low-cost laser or water jet cutting or by punching instead of the usual complex milling process.

The axes of the spokes do not necessarily pass through the center of the transducer, though it can, if less than 6 axes have to be measured or if specific strain measurement is being used.

For full 6 axis measurement the spoke axis can be tilted from the radial direction, leading to a non-symmetric structure. The angle of tilting can vary between 0° (radial) and 90° (tangential), for example, between 30 and 60°.

The number of spokes can be at minimum 3 whereas the sensitivity to force and torque in different directions can be tailored by variations of the spoke and ring width and of the complete transducer thickness.

The thickness of the structure can be constant but thickness variations can also be possible (e.g. reduced thickness behind a strain gauge to increase sensitivity locally).

The number of strain gauges can be at minimum two per spoke, for example up to four, with defined radial and circumferential distance. In the case the transducer is made by a sheet, strain gauges can also be applied to both surfaces of the sheet and/or to the ring structures.

An exemplary embodiment of the disclosure uses non-radial spokes (transducer asymmetry) with axial strain gauges on the spokes. An exemplary embodiment of the disclosure uses non-radial strain measurement on radial spokes (transducer symmetry, strain measurement asymmetry), e.g. shear strain or transversal strain measurement. A combination of both is also possible.

Strain gauges can be foil strain gauges or semiconductor strain gauges or thin film sputtered strain gauges. An exemplary embodiment of the disclosure uses semiconductor strain gauges.

Alternative strain measurement devices (e.g. piezo-resistive materials, optical readout, magnetostrictive materials etc.) can also be applicable.

The strain gauges can be preassembled on a carrier foil including complete wiring (electrical connections) and possibly also electronic components (e.g. power supply, amplification), so that all strain gauges (and electronics) can be mounted in one step, with precise and reproducible orientation. In the thin film sputtering process all electrical connections can be applied using the same technology as for the strain gauges.

Alternatively, the way of mounting as described in the patent application PCT/EP2009/000811 can be used (e.g., complete circuitry prefabricated on flexible PCB with gaps, into which the strain gauges are mounted and contacted to the PCB).

For specific combinations of forces and torques two such planar sensors can be stacked, with different spoke geometry for tailored sensitivity.

In FIG. 1 a known radially symmetric spoke wheel 10 is shown having four radially symmetric spokes 12 whereas each is being equipped with one strain gauge 14.

In order to measure 3 forces and 3 torques, at least 6 strain gauges may be used, which means that at least 2 spokes need 2 strain gauges. It is easy to understand from this drawing that this arrangement needs at least four spokes 12 per spoke wheel 10 which are radially symmetric arranged and each equipped with at least one strain gauge in order to accomplish the strain measurement needs in any axes.

In order to overcome the efforts with this measuring arrangement and reduce the effort and improve the accuracy of the strain measurement it has been found with the present disclosure that the radially symmetry should be renounced.

Hence the disclosure is directed to a new and different arrangement of the strain gauges as for the direction of strains respectively their different planes and levels.

Figure 2:
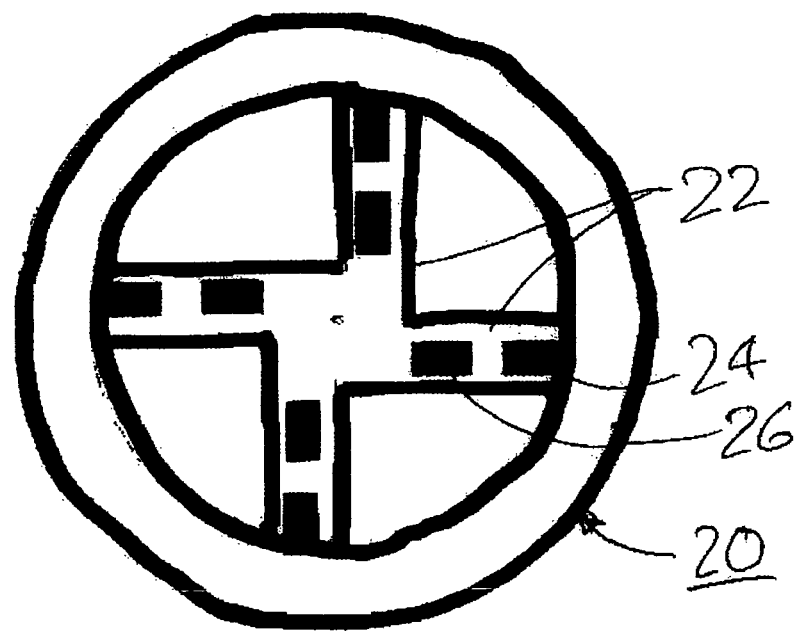
FIG. 2 shows an exemplary embodiment of the disclosure having a spoke wheel with four spokes being arranged not radially symmetric and each equipped with two strain gauges.

Accordingly an exemplary embodiment of the disclosure shown in FIG. 2 a spoke wheel 20 has four spokes 22 whereby the spokes 22 are not radially symmetric.

Each spoke 22 is aligned to in parallel to the radius (e.g., each spoke 22 extends along a secant whereat each secant respectively each spoke 22 includes a right angle with the neighboring spoke 22).

According to an exemplary embodiment of the disclosure, each spoke can be provided with a pair of strain gauges 24, 26 where these strain gauges 24, 26 are for measurement purposes and can be aligned with the respective spoke 22 or at an angle e.g. 90°.

Because the strain gauges 24, 26 are arranged in this manner, the measurement of strains at various planes or levels respectively axes is feasible.

Figure 3:
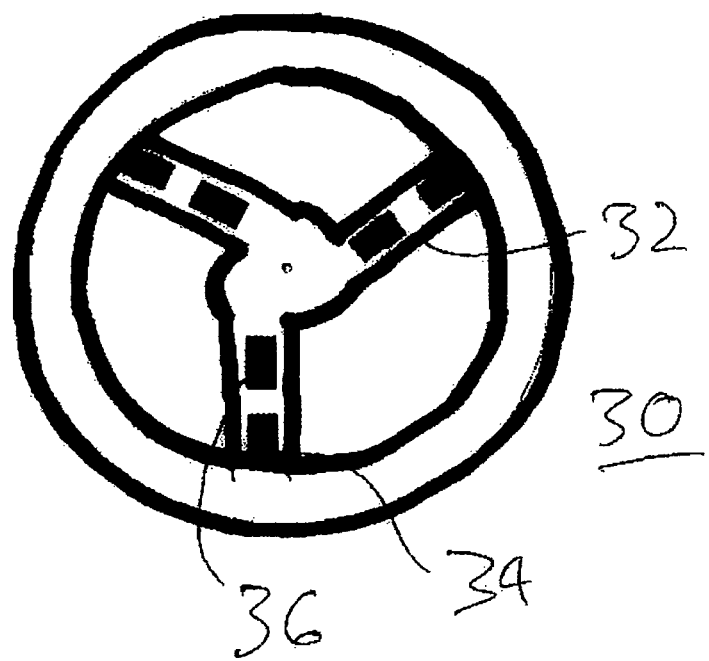
FIG. 3 shows an exemplary embodiment of the disclosure having a spoke wheel with three spokes each being arranged at an angle of 120° to the next spoke and each equipped with two strain gauges.

In FIG. 3, an exemplary embodiment of the disclosure is shown, wherein a spoke wheel 30 has three spokes 32 all being arranged at an angle of 120°. Consequently each spoke 32 is directed in a different direction i.e. in a different axis. Each spoke 32 can be furnished with a pair of strain gauges 34, 36 which are adjusted along the long axis of the spoke 32 or at an angle. This arrangement enables the measurement of six degrees of freedom with a minimum number of strain gauges.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A multiaxial force-torque sensor, comprising:
    a transducer structure, including two concentric rings connected with spokes;
    strain gauges placed in defined areas to measure strain, from which forces and torques are calculated, wherein the transducer structure is a planar mechanical structure, and all strain gauges are applied to a same surface of the transducer structure for measuring non-radial strain components; and at least one of non-radial spokes providing transducer asymmetry and axial strain gauges on the non-radial spokes and non-radial strain measurement on radial spokes providing a transducer symmetry and strain measurement asymmetry.

2. The multiaxial force-torque sensor according to claim 1, wherein the transducer structure, comprises:
    two concentric rings connected with 3 spokes that are not radially symmetric.

3. The multiaxial force-torque sensor according to claim 1 wherein the strain gauges are applied to the spokes transversely or at an angle.

4. The multiaxial force-torque sensor according to claim 1, wherein the strain gauges are arranged to measure shear strains along the spokes.

5. The multiaxial force-torque sensor according to claim 1, comprising:
    at least 6 strain gauges to measure 3 force and 3 torque components.

6. The multiaxial force-torque sensor according to claim 1, wherein the strain gauges are arranged in an out of spoke-axis position to obtain asymmetry.

7. The multiaxial force-torque sensor according to claim 1, wherein the transducer structure has a uniform thickness where only the contour is machined.

8. The multiaxial force-torque sensor according claim 7, wherein the transducer structure is steel or aluminum sheet material.

9. The multiaxial force-torque sensor according to claim 7, wherein the transducer structure is manufactured via laser, water jet cutting or by punching.

10. The multiaxial force-torque sensor according to claim 1, wherein the axes of the spokes do not pass through a center of the transducer.

11. A multiaxial force-torque sensor, comprising:
    a transducer structure, including two concentric rings connected with spokes; and
    strain gauges placed in defined areas to measure strain, from which forces and torques are calculated, wherein the transducer structure is a planar mechanical structure, and all strain gauges are applied to a same surface of the transducer structure for measuring non-radial strain components,
    wherein the spoke axis is tilted from the radial direction, leading to a non-symmetric structure for full 6 axis measurement.

12. The multiaxial force-torque sensor according to claim 11, wherein the angle of tilting varies between 0° (radial) and 90° (tangential).

13. The multiaxial force-torque sensor according to claim 1, wherein variations of the spoke width and the complete transducer thickness are selected to tailor the sensor's sensitivity to force and torque in different directions.

14. The multiaxial force-torque sensor according to claim 1, wherein widths of the spokes vary over length, while a thickness of the transducer structure is constant.

15. The multiaxial force-torque sensor according to claim 1, wherein the number of strain gauges is at least two per spoke with defined radial and circumferential distances.

16. The multiaxial force-torque sensor according to claim 1, where strain gauges are applied to at least one of both surfaces of a sheet structure and the concentric rings.

17. The multiaxial force-torque sensor according to claim 1, comprising:
    non-radial spokes for transducer asymmetry, with axial strain gauges on the spokes.

18. The multiaxial force-torque sensor according to claim 1, wherein the strain gauges are foil strain gauges, or semiconductor strain gauges or thin film sputtered strain gauges, or semiconductor strain gauges.

19. The multiaxial force-torque sensor according to claim 1,
    wherein the strain measurement gauges are piezo-resistive materials, or optical readout, or magnetostrictive materials.

20. The multiaxial force-torque sensor according to claim 1, wherein the strain gauges are preassembled on a carrier foil including complete wiring with electrical connections.

21. The multiaxial force-torque sensor according to claim 20, comprising:
    electronic components for power supply and/or amplification, preassembled on the carrier foil.

22. The multiaxial force-torque sensor according to claim 1, wherein all of the strain gauges have been manufactured and mounted with electronics in one step, with precise and reproducible orientation.

23. The multiaxial force-torque sensor according to claim 20, comprising:
    thin film sputtered electrical connections which are applied by using a same technology as for the strain gauges.

24. The multiaxial force-torque sensor according to claim 1, configured as two stacked planar sensors, each with different spoke geometry for tailored sensitivity and for specified forces and torques.

* * * * *